(12) United States Patent
Schulman

(10) Patent No.: US 11,532,970 B2
(45) Date of Patent: Dec. 20, 2022

(54) ENERGY CONVERSION SYSTEMS AND METHODS

(71) Applicant: Richard A. Schulman, San Diego, CA (US)

(72) Inventor: Richard A. Schulman, San Diego, CA (US)

(*) Notice: Subject to any disclaimer, the term of this patent is extended or adjusted under 35 U.S.C. 154(b) by 907 days.

(21) Appl. No.: 16/367,000

(22) Filed: Mar. 27, 2019

(65) Prior Publication Data

US 2020/0313513 A1   Oct. 1, 2020

(51) Int. Cl.
| | |
|---|---|
| *H02K 7/18* | (2006.01) |
| *B60R 19/18* | (2006.01) |
| *B60R 16/03* | (2006.01) |
| *H02K 7/116* | (2006.01) |

(Continued)

(52) U.S. Cl.
CPC ....... *H02K 7/1853* (2013.01); *B60R 16/0307* (2013.01); *B60R 19/18* (2013.01); *B60R 21/04* (2013.01); *H02K 7/116* (2013.01); *B60J 5/00* (2013.01)

(58) Field of Classification Search
CPC ..... B60R 19/18; B60R 16/0307; B60R 21/04; H02K 7/1853; H02K 7/116; H20K 7/116; B60J 5/00
See application file for complete search history.

(56) References Cited

U.S. PATENT DOCUMENTS

| | | |
|---|---|---|
| 3,747,969 A | 7/1973 | Diener |
| 3,794,136 A | 2/1974 | Okada |
| 3,945,459 A | 3/1976 | Oishi et al. |

(Continued)

FOREIGN PATENT DOCUMENTS

| | | |
|---|---|---|
| CN | 108749924 | 11/2018 |
| DE | 102006026447 | 12/2007 |

(Continued)

OTHER PUBLICATIONS

International Search Report dated May 8, 2020 in corresponding International Application No. PCT/US20/20337, filed Jan. 28, 2020.

*Primary Examiner* — D Glenn Dayoan
*Assistant Examiner* — Melissa Ann Bonifazi
(74) *Attorney, Agent, or Firm* — Knobbe Martens Olson & Bear, LLP

(57) ABSTRACT

Energy conversion systems and methods are disclosed. In one aspect, the system is for converting or redirecting energy received by an impact to an automobile in a proximal direction into another type of energy. The system includes a body having a first engagement structure and an impact member configured to be installed within an outer perimeter compartment of the automobile to receive an impulse. The impact member having a second engagement structure and a third engagement structure. The second engagement structure being configured to engage with the first engagement structure of the body to facilitate the impact member translating in the direction relative to the body. The system further includes a converter having a fourth engagement structure, the fourth engagement structure being configured to engage with the third engagement structure of the impact member and convert the energy received by the impact member into another type of energy. The system may change or redirect a direction of a force vector associated with the received impulse.

23 Claims, 8 Drawing Sheets

(51) Int. Cl.
    *B60R 21/04*     (2006.01)
    *B60J 5/00*     (2006.01)

(56) References Cited

U.S. PATENT DOCUMENTS

| | | |
|---|---|---|
| 5,169,204 A | 12/1992 | Kelman |
| 2007/0043507 A1 | 2/2007 | Tobaru |
| 2013/0127175 A1 | 5/2013 | Zuo et al. |
| 2014/0325970 A1 | 11/2014 | Radowski |

FOREIGN PATENT DOCUMENTS

| | | |
|---|---|---|
| DE | 102013216599 | 2/2015 |
| KR | 100676281 | 1/2007 |
| WO | WO 2012/093945 | 7/2012 |

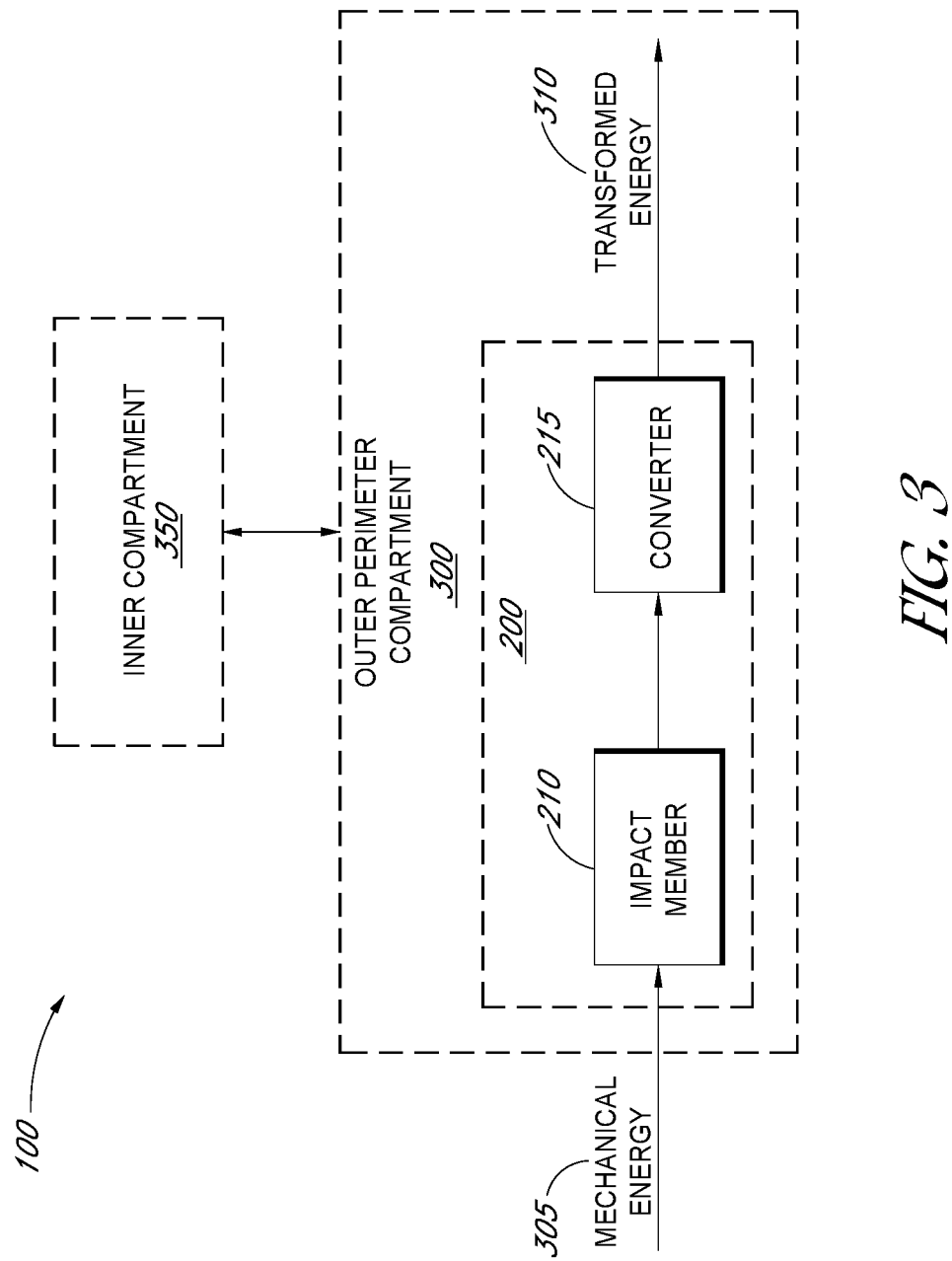

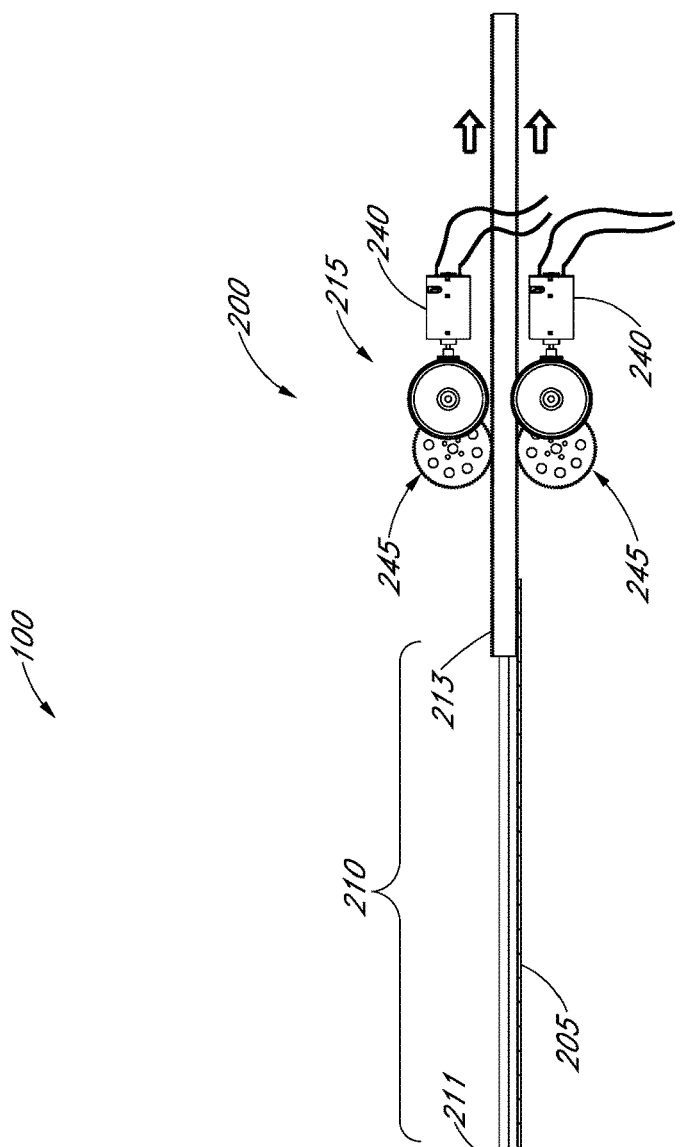
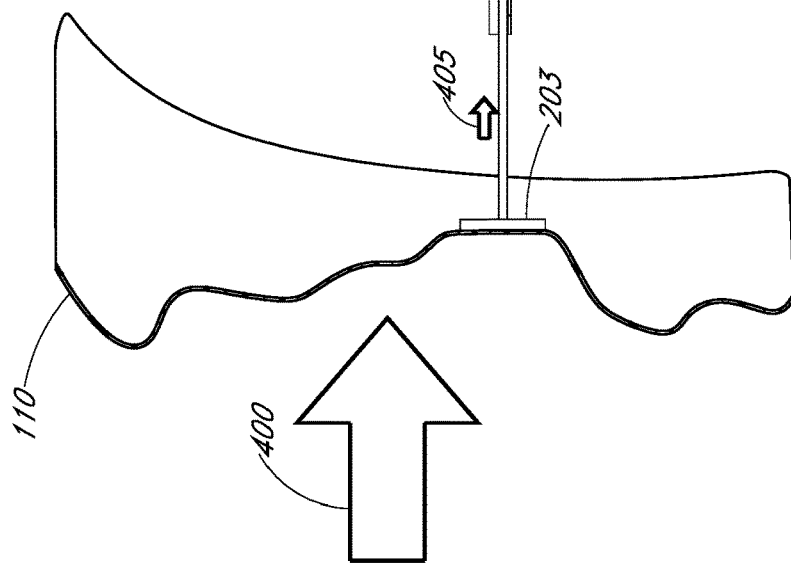
FIG. 4B

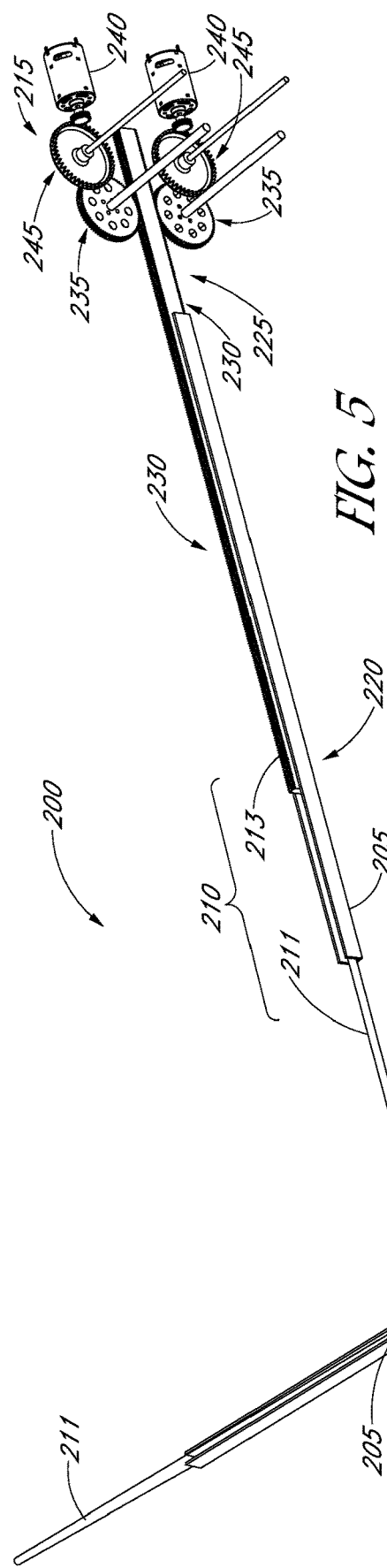
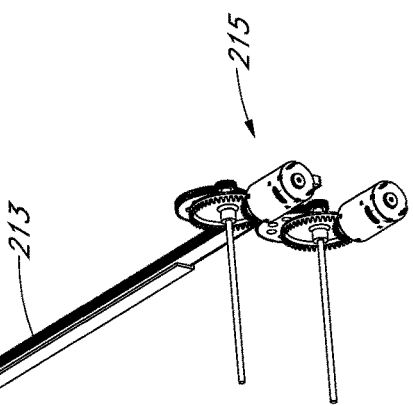
FIG. 5
FIG. 6

ENERGY CONVERSION SYSTEMS AND METHODS

BACKGROUND

Field

The systems and methods disclosed herein are directed to impact energy transformation systems. In certain embodiments, the impact energy transformation systems are employed in vehicles including automobiles. In certain other embodiments, the impact energy transformation systems are employed in sporting goods including boxing vests and football helmets to reduce harm from impact.

Description of the Related Technology

Automobiles typically include one or more bumpers located at the front and/or back of a vehicle. The bumpers absorb energy during a collision with another object. Bumpers typically extend in a width wise direction, or transverse, across the front and rear of the vehicle. The bumpers can be mounted to rails that extend in a lengthwise direction. Many bumpers are designed to reduce damage to the vehicle and/or vehicle passengers by absorbing energy from an impact to the bumper via physical deformation of the bumper.

SUMMARY

The systems, methods and devices of this disclosure each have several innovative aspects, no single one of which is solely responsible for the desirable attributes disclosed herein.

In one aspect, there is provided an energy conversion system for converting a first type of energy received by an impact to an automobile in a proximal direction into a second type of energy. The automobile comprises an outer perimeter compartment and an inner compartment. The energy conversion system comprises a body having a first engagement structure and an impact member configured to be installed within the outer perimeter compartment of the automobile to receive an impulse of the first type of energy in the proximal direction from the impact and translate in a direction relative to the body in response to the impulse. The impact member has a first end, a second end, a second engagement structure, and a third engagement structure. The second engagement structure and the third engagement structure are disposed between the first end and the second end. The second engagement structure is configured to engage with the first engagement structure of the body to facilitate the impact member translating in the direction relative to the body. The energy conversion system further comprises a converter disposed relative to the body and having a fourth engagement structure, the fourth engagement structure being configured to engage with the third engagement structure of the impact member and convert the first type of energy received by the impact member into the second type of energy.

In another aspect, there is provided an energy conversion system for converting a first type of energy received by an impact to an automobile in a proximal direction into a second type of energy. The automobile comprises an outer perimeter compartment and an inner compartment. The energy conversion system comprises a body having a first engagement structure and an impact member configured to be installed within the outer perimeter compartment of the automobile to receive an impulse of the first type of energy in the proximal direction from the impact. The impact member has a second engagement structure and a third engagement structure. The second engagement structure is configured to engage with the first engagement structure of the body. The energy conversion system further comprises a converter having a fourth engagement structure configured to engage with the third engagement structure of the impact member and convert the first type of energy received by the impact member into the second type of energy.

In another aspect, there is provided a method for converting energy from a first type of energy received by an impact to an automobile in a proximal direction into a second type of energy. The automobile comprises an outer perimeter compartment and an inner compartment. The method comprises providing a body having a first engagement structure, providing an impact member configured to be installed within the outer perimeter compartment of the automobile, the impact member having a second engagement structure and a third engagement structure, and receiving, by the impact member, an impulse of the first type of energy in the proximal direction from the impact. The method further comprises translating the impact member via engagement between the first engagement structure and the second engagement structure in a direction relative to the body in response to the impulse and converting the first type of energy received by the impact member into the second type of energy via engagement between the impact member and a converter.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIG. 3 is a block diagram conceptually illustrating an inner compartment and an outer compartment of the automobile of FIGS. 1 and 2 where the inner compartment is configured to transport passengers.

FIG. 4B is similar to FIG. 4A except that the event of the impact has occurred deforming a portion of the front end of the automobile.

FIGS. 5 and 6 illustrate more detailed views of a single energy conversion system in accordance with aspects of this disclosure.

DETAILED DESCRIPTION

While the traditional bumpers installed on an automotive vehicle may be sufficient for absorbing energy from an impact during a collision, the traditional bumpers may deform even during very low energy collisions (e.g., in collisions at relative speeds of less than a threshold speed, such as 5 miles per hour or 2.5 mile per hour). Thus, the owner of the vehicle may wish to replace the bumper(s) involved in such a low energy collision due to the deformation of the bumpers in the collision, leading to increased costs of ownership and/or insurance for the vehicle owner. In addition, current structures only absorb some of the impact energy/force, leaving a great deal to cause harm to passengers of the vehicle.

Aspects of this disclosure relate to an energy conversion system which can be used in combination with, for example, an automotive vehicle bumper in order to reduce and/or prevent deformation of the vehicle bumper(s) for certain low energy collisions (e.g., collisions at speeds less than a threshold speed) as well as affect the directional aspect of the energy and force vectors associated with the impact energy/force.

For example, the energy conversion system may be configured to convert at least a portion of the energy of the collision into a different form of energy which can be dissipated during the collision, thereby reducing the amount of energy adsorbed by the remainder of the automobile and its passengers. In certain collisions, the energy absorbed by the energy conversion system may be sufficient to reduce the amount of energy absorbed by the passengers to a level reducing injuries.

In certain collisions, the force vectors associated with the energy absorbed by the energy conversion system may be changed or redirected by the energy conversion system to reduce the amount of energy absorbed by the passengers to a level reducing injuries. For example, the energy conversion system may be configured to change or redirect at least a portion of the force vectors associated with the absorbed energy to reduce the amount of energy adsorbed by the remainder of the automobile and its passengers or preferentially redirect the energy away from certain portions of the automobile and/or the passengers.

Figure 1:
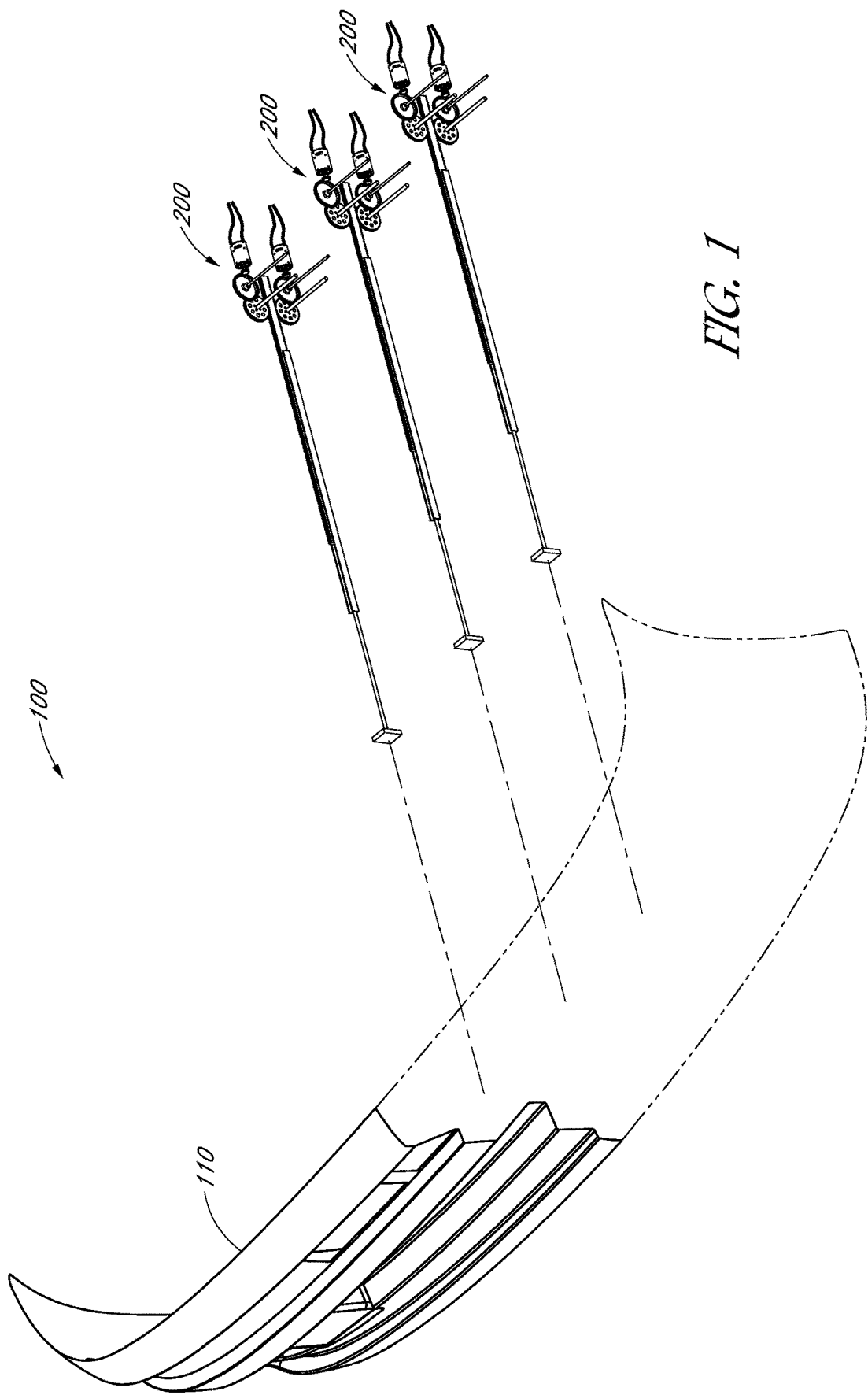
FIG. 1 illustrates an exemplary embodiment of a front end or rear end of an automobile including a bumper and a plurality of energy conversion systems disposed with respect to the bumper in accordance with aspects of this disclosure.

FIG. 1 illustrates an exemplary embodiment of a vehicle in the form of an automobile 100. The disclosure is not limited to automobiles 100 and may be employed in helmets, vests, etc. In certain embodiments, the energy conversion system is disposed in a pillow or other structure.

Figure 2:
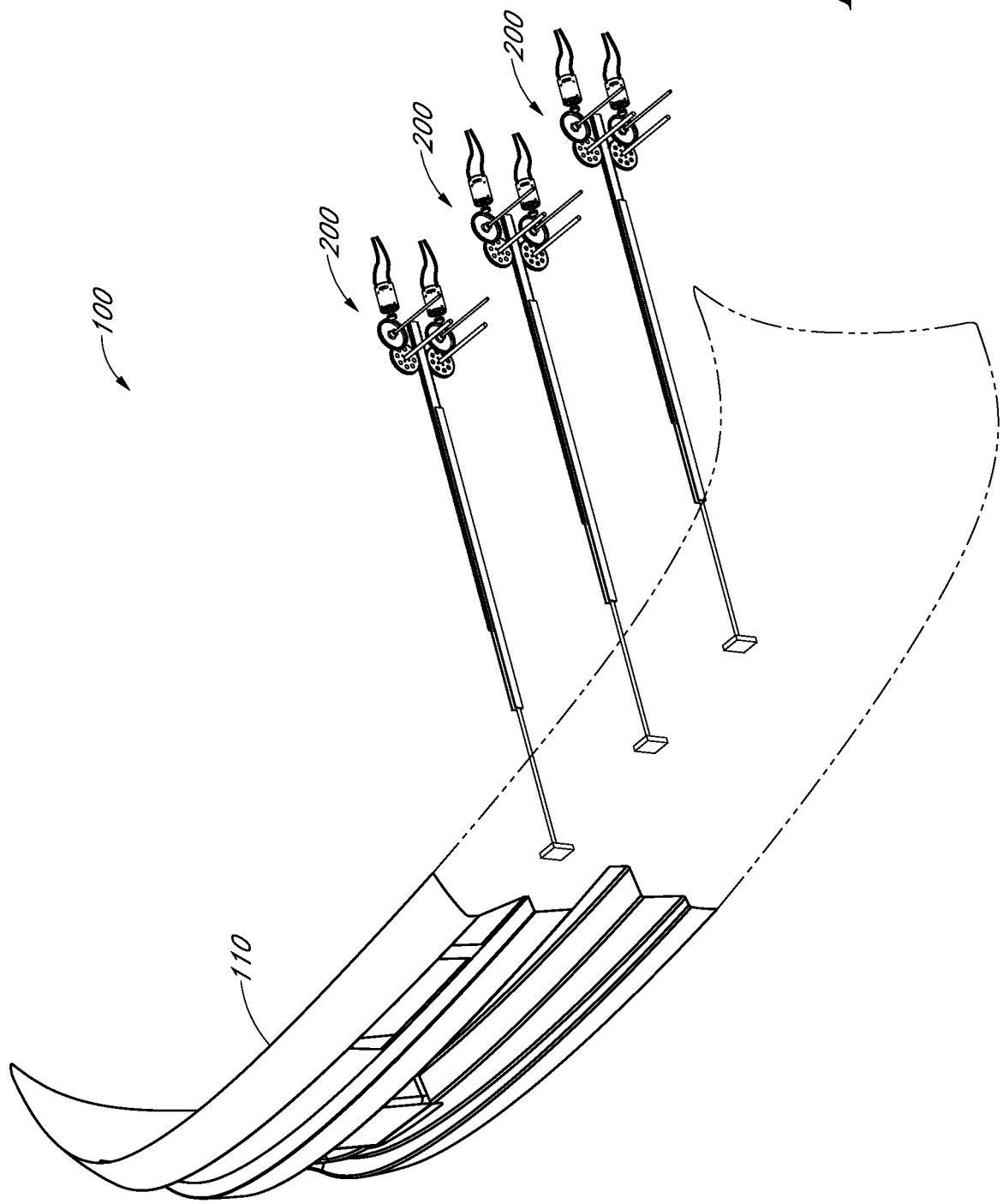
FIG. 2 illustrates the front end or rear end of the automobile of FIG. 1 in which the plurality of energy conversion systems are coupled to the bumper of the automobile.

In certain embodiments, the automobile 100 includes a plurality of energy conversion systems 200 in accordance with aspects of this disclosure. FIG. 2 illustrates the automobile 100 of FIG. 1 in which the energy conversion systems 200 are coupled with a bumper 110 of the automobile.

As shown in FIGS. 1 and 2, the automobile includes the bumper 110 and a plurality of energy conversion systems 200. However, this disclosure is not limited to the use of three illustrated energy conversion systems 200 as shown in FIGS. 1 and 2 and may, for example, include any number of energy conversion systems 200 such as a single energy conversion system 200 or an arbitrarily large number of energy conversion systems 200 arranged in a row or array (e.g., an array of two rows and ten columns, an array of four rows and 25 columns, etc.).

Each of the energy conversion systems 200 is configured to receive a first type of energy (e.g., a physical impact on the bumper 110) and convert or otherwise transform at least a portion of the received energy into a second, different form of energy (e.g., into electrical energy, thermal energy, etc.) in certain embodiments.

FIG. 3 is a block diagram conceptually illustrating different compartments of the automobile 100 of FIGS. 1 and 2. With reference to FIG. 3, the automobile 100 comprises an outer perimeter compartment 300 and an inner perimeter compartment 350. In some embodiments, the inner compartment 350 is configured for passengers. In certain embodiments, the inner compartment 350 may comprise a cabin in which passengers can be transported while the automobile is in motion. Similarly, the outer perimeter component 300 may physically surround at least a portion of the inner compartment 350. In certain embodiments, the outer perimeter component 300 may comprise one or more structural components configured to prevent physical injury to the passenger(s) during an impact or collision by absorbing at least a portion of the energy from the impact during the collision. Examples of the structural components include: one or more bumper(s) 110, one or more door(s), one or more side panel(s), a roof, etc. In some embodiments, at least a portion of the energy conversion system 200 may be installed in the outer perimeter compartment 300, for example, within the structural components designed to absorb energy from the collision.

As shown in FIG. 3, mechanical energy 305 including kinetic energy (e.g., a first type of energy received by an impact) may be transmitted to a portion of the outer perimeter compartment 300 during a collision. The mechanical energy 305 may be transmitted to the automobile 100 in a proximal direction. In other words, the mechanical energy 305 may be received by an impact at the outer perimeter compartment 300 along a direction towards the inner compartment 350. Since the outer perimeter compartment 300 surrounds at least a portion of the inner compartment 350, the inner compartment 350 may be located at a proximal position with respect to the outer perimeter compartment 300 (e.g., at a distal position).

Each of the energy conversion systems 200 may comprise an impact member 210. In certain embodiments, the impact member 210 is mechanically coupled to the outer perimeter compartment 300 so as to receive at least a portion of the mechanical energy 305. For example, the impact member 210 may be configured to be installed within the outer perimeter compartment 300 of the automobile 100.

The impact member 210 may transmit the received mechanical energy 305 to a converter 215. In certain embodiments, the converter 215 is configured to convert or otherwise transform the mechanical energy 305 received by the impact member 210 into a second type of energy (e.g., transformed energy 310).

The converter 215 may further be configured to dissipate the transformed energy 310, thereby reducing the total amount of impact energy imparted into the outer perimeter compartment 300. Thus, the deformation of the outer perimeter compartment 300 (e.g., the bumper 110 or door) can be prevented or reduced, along with the associated repair costs.

Figure 4A:
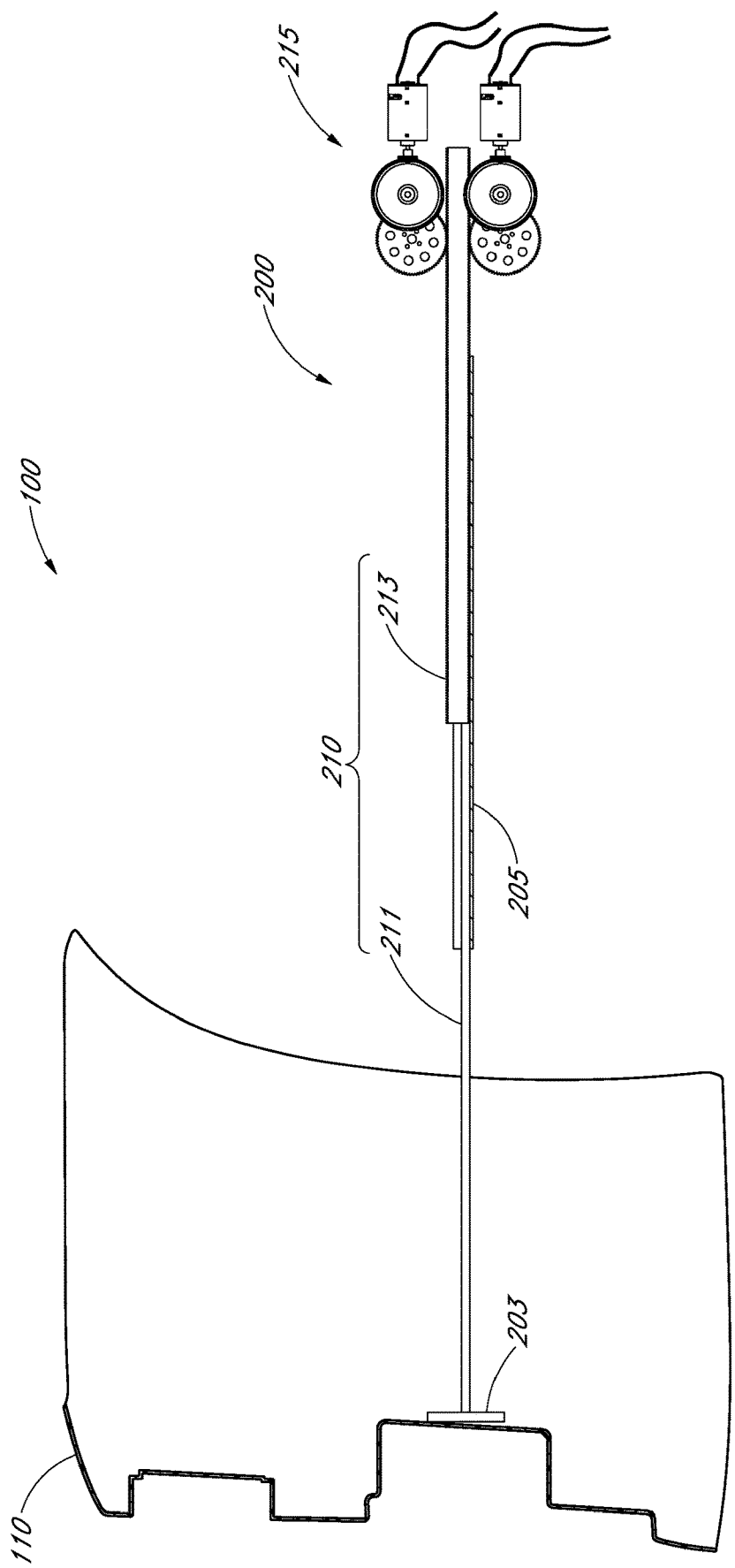
FIG. 4A illustrates another exemplary embodiment of the front end or rear end of the automobile including the plurality of energy conversion systems prior to an event of an impact in accordance with aspects of this disclosure.

FIGS. 4A and 4B illustrate an embodiment of the automobile 100 including the energy conversion systems 200 in the event of an impact in accordance with aspects of this disclosure. In particular, FIG. 4A illustrates a view of the automobile 100 prior to receiving an impact while FIG. 4B illustrates another view of the automobile 100 after receiving the impact.

With reference to FIGS. 4A and 4B, only a single energy conversion system 200 is illustrated to show the components of the energy conversion system 200 in some embodiments.

However, a plurality of the energy conversion systems 200 may be included in other embodiments.

The energy conversion system 200 of FIGS. 4A and 4B includes a body 205 configured to be engaged with an impact member 210 and a converter 215. The body 205 may be fixed relative to the automobile 100. In some embodiments, the body 205 may be fixed to a frame of the automobile 100.

The body 205 may include a channel configured to slidingly receive at least a portion of the impact member 210. The body 205 and the impact member 210 may be arranged coaxially such that the impact member 210 can be slid through the channel. In some embodiments, the impact member 210 may include a contact portion 211 and a track portion 213. However, in other embodiments, the contact portion 211 and the track portion 213 may be formed as a single component. In some embodiments, the impact member 210 may be connected to the bumper 110 (or other portion of the outer perimeter compartment 300) via a connection portion 203. The connection portion 203 may be embodied as a plate interposed between the bumper 110 and the contact portion 211.

As shown in FIG. 4B, during a collision, the bumper may receive an impact 400 in a proximal direction. The proximal direction may be a direction generally towards a center of the automobile 100. At least a portion of the impact 400 energy is transmitted to the impact member 210 via the connection portion 203 such that the impact member 210 receives an impulse 405 of a first type of energy in the proximal direction from the impact 400. The impact member 210 is also translated in a direction relative to the body 205 in response to the impulse 405. The direction of translation of the impact member 210 in response to the impulse 405 may be substantially parallel to the proximal direction. In other embodiments, the direction of translation of the impact member 210 in response to the impulse 405 may be substantially perpendicular to an external surface of the outer perimeter compartment 300 (e.g., the bumper 110) at the point of connection between the outer perimeter compartment 300 and the energy conversion system 200.

The converter 215 is disposed relative to the body 205 and is configured to engage with the impact member 210 and convert the first type of energy received by the impact member 210 into a second type of energy. For example, the track portion 213 may be configured to engage with one or more gears 245 of the converter 215. In certain embodiments, the one or more gears 245 are configured as a transmission and/or gear box. The one or more gears 245 may be configured to transfer the energy received from the track portion 213 as the track portion 213 slides past the one or more gears 245 into one or more electric motors 240. The one or more electric motors 240 may be configured to convert the mechanical energy 305 received from the one or more gears 240 into the transformed energy 310. In certain embodiments, the transformed energy 310 is electrical energy.

FIGS. 5 and 6 illustrate more detailed views of an exemplary energy conversion system 200 in accordance with aspects of this disclosure. As previously discussed, in certain embodiments the energy conversion system 200 includes the body 205, the impact member 210, and the converter 215. The body 205 may have a first engagement structure 220. In some embodiments, the first engagement structure 220 may be formed as the channel within the body 205. The channel may be configured to slidingly receive at least a portion of the impact member 210.

The impact member 210 may have a first end (e.g., connected to the connection portion 203), a second end (e.g., adjacent to the converter 215 in the illustrated embodiment), a second engagement structure 225, and a third engagement structure 230. The second engagement structure 225 and the third engagement structure 230 may be disposed between the first end and the second end of the impact member 210. The second engagement structure 225 is configured to engage with the first engagement structure 220 of the body 205 to facilitate the impact member 210 translating in the direction relative to the body 205. The second engagement structure 225 may include the shape and size of the impact member 210. For example, the second engagement structure 225 may be a predetermined size and shape of at least a portion of the impact member 210 such that, the portion of the impact member 210 is configured to be slidingly received by at least a portion of the first engagement structure 220.

As shown in FIGS. 5 and 6, the impact member 210 may include the contact portion 211 and the track portion 213. Both the contact portion 211 and the track portion 213 may be configured to translating together relative to the body 205 in response to an impulse 405 (e.g., see FIG. 4B). In some embodiments, the contact portion 211 may be configured as a cylindrical shaft and the track portion 213 may be configured as a rectangular shaft. However, this disclosure is not limited thereto. For example, the impact member 210 may be formed as a single component and may be configured as a rectangular shaft extending along substantially the entire length of the impact member 210. In some embodiments, each of the second and third engagement structures 225 and 230 are disposed on the track portion 213 of the impact member 210.

The converter 215 may have a fourth engagement structure 235. The fourth engagement structure 235 may be configured to engage with the third engagement structure 230 of the impact member 210. In some embodiments, the third engagement structure 230 may be formed as one or more teeth disposed on the track portion 213. The one or more teeth may be formed on an edge of the track portion 213, for example, the one or more teeth may be formed on the top and bottom of the track portion 213 as shown in FIGS. 5 and 6.

In some embodiments, the fourth engagement structure 235 may be formed as a plurality of teeth disposed on the one or more electric motors 240 so as to engage with the third engagement structure 230 of the impact member 210.

The converter 215 may also include the one or more gears 245 with a plurality of the teeth being disposed on the one or more gears 245. A first portion of the teeth on the one or more gears 245 may be configured to engage with the teeth of the track portion 213. A second portion of the teeth on the one or more gears 245 may be configured to engage with the one or more electric motors 240.

The converter 215 may further include the one or more electric motors 240 in certain embodiments. The one or more electric motors 240 are configured to convert a first type of energy into a second type of energy in certain embodiments. In some embodiments, the one or more electric motors 240 may be configured to convert the kinetic energy of the mechanical energy 305 into transformed energy 310 in the form of electrical energy. The one or more electric motors 240 may be configured to supply the generated electrical energy to one or more components configured to dissipate the electrical energy. In some embodiments, the one or more electric motors 240 may be electrically connected to one or more lights (e.g., LEDs, halogen, etc.)

configured to dissipate the electrical energy as light and/or heat. In other embodiments, the converter 215 may be configured to convert the kinetic energy of the mechanical energy 305 into transformed energy 310 in the form of thermal energy. For example, the one or more electric motors 240 may be electrically connected to a radiator configured to convert the electrical energy into thermal energy.

In some embodiments, the one or more electric motors 240 can be arranged differently from the orientation of the one or more electric motors 240 illustrated in FIGS. 5 and 6. For example, the one or more electric motors 240 may be arranged at 90° from the embodiment illustrated in FIGS. 5 and 6 so that the impact member 210 can be directly connected to teeth formed on a shaft of the one or more electric motors 240. In other embodiments, the one or more electric motors 240 may still be connected to the impact member 210 via the one or more gears 245.

In certain collisions, the energy conversion system 200 changes or redirects the force vectors associated with the energy absorbed by the energy conversion system 200 to reduce the amount of energy absorbed by the passengers to a level reducing injuries. For example, the energy conversion system 200 may be configured to change or redirect at least a portion of the force vectors associated with the absorbed energy to reduce the amount of energy adsorbed by the remainder of the automobile 100 and its passengers or preferentially redirect the energy away from certain portions of the automobile 100 and/or the passengers. In certain embodiments, angles between the direction of impact and one or more components of the energy conversion system 200 are arranged to preferentially redirect the absorbed energy away from certain portions of the automobile 100 and/or the passengers.

In yet other embodiments, the converter 215 may be configured to convert the mechanical energy 305 from one form to another form or transformed energy 310. For example, the converter 215 may comprise one or more flywheels configured to store the mechanical energy 305 received from the impact member 210 as rotational energy. Those skilled in the art will understand that the converter 215 may also be configured to convert the mechanical energy 305 from the impact member 210 into other forms of energy in other embodiments. Examples of the types of energy or transformed energy 310 into which the mechanical energy 305 can be converted include: to thermal (heat) energy, radiant (electromagnetic) energy, chemical energy (e.g., by storing the converted energy into a secondary battery), another form of mechanical energy (e.g., into a flywheel), acoustic energy, etc.

In certain embodiments, the energy conversion system 200 comprises one or more inductors configured to briefly store at least a portion of the absorbed energy and slow the conversion/discharge process. In certain embodiments, the one or more inductors reduce peak electrical energy output by the energy conversion system 200.

In some embodiments, the converters 215 may include one or more piezoelectric transducers configured to directly convert the mechanical energy 305 into electrical energy. The electric energy can then be dissipated as discussed in the above embodiments in which the energy conversion system 200 includes one or more electric motors 240.

Figure 7:
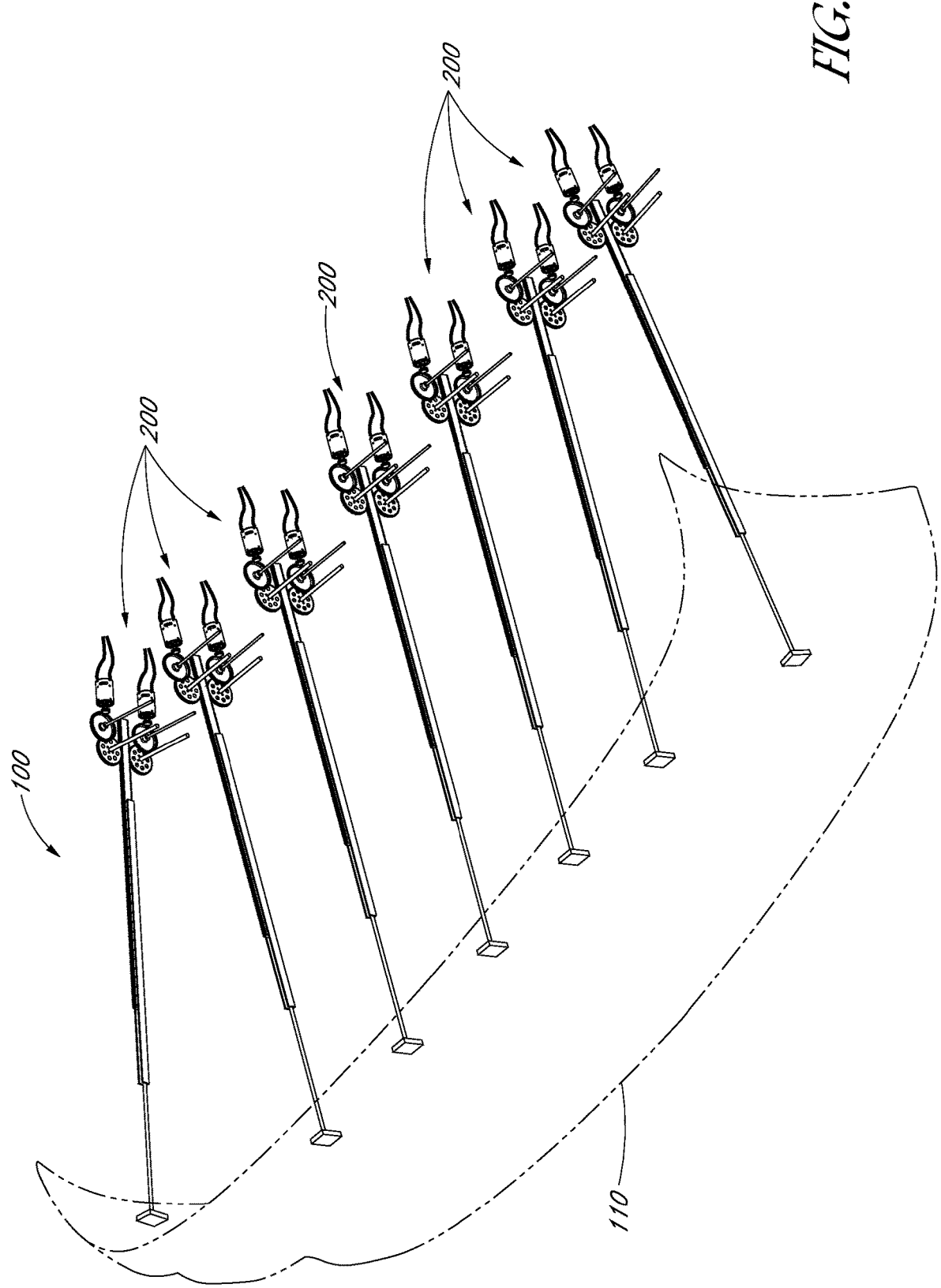
FIG. 7 illustrates an exemplary arrangement of the plurality of energy conversion systems relative to a front or rear bumper of an automobile in accordance with aspects of this disclosure.

FIG. 7 illustrates another exemplary embodiment of an automobile including a plurality of energy conversion systems 200 in accordance with aspects of this disclosure. In the FIG. 7 embodiment, at least some of the energy conversion systems 200 may be positioned at an angle with respect to the other energy conversion systems 200. For example, two of the energy conversion systems 200 closest to the sides of the bumper 110 may be formed at an angle with respect to the other energy conversion systems 200. In other words, the energy conversion systems 200 adjacent to the sides of the bumper 110 are not substantially parallel to the other energy conversion systems 200.

In some embodiments, each of the energy conversion systems 200 may be arranged to be substantially perpendicular to an external surface of the outer perimeter compartment 300 (e.g., the bumper 110) at the point of connection between the outer perimeter compartment 300 and the energy conversion system 200. In some collisions, the impact 400 may be received in a proximal direction, which is substantially perpendicular to the external surface of the outer perimeter compartment 300. Thus, these embodiments may have a higher probability of receiving more of the impact 400 along the direction of the impact member 210 due to the angle formed between the energy conversion systems 200 and the outer perimeter compartment 300.

In some embodiments, one or more of the energy conversion systems 200 may be set back at a different distance or staggered relative the outer perimeter compartment 300 than one or more other energy conversion systems 200. This may enable the energy conversion systems 200 to absorb the impact 400 in separate stages based on the distances between the energy conversion systems 200 and the outer perimeter compartment 300.

In some embodiments, the energy conversion systems 200 may have differing resistances to the impact 405 transmitted to the impact member 210. This may be advantageous since different resistances may be more suited to absorbing impacts 400 at different speeds of collision. In some embodiments, the differing resistances to the impact 405 can be achieved by different gearing between the impact members 210 and the converters 215 and/or by adjusting the converters 215 themselves (e.g., the internal gearing of the one or more electric motors 240, the type of converter 215 used, etc.).

In some embodiments, at least some of the energy conversion system 200 may be connected in series. For example, each of the impact members 210 may be connected to four or more of the electric motors 240 arranged in line along the longitudinal axis of the energy conversion system 200. In other embodiments, the impact member 210 may comprise a pair of track portions 213 arranged in a line within the channel of the body 205. Each of the track portions 213 may be separately engaged with one or more electric motors 240.

Figure 8:
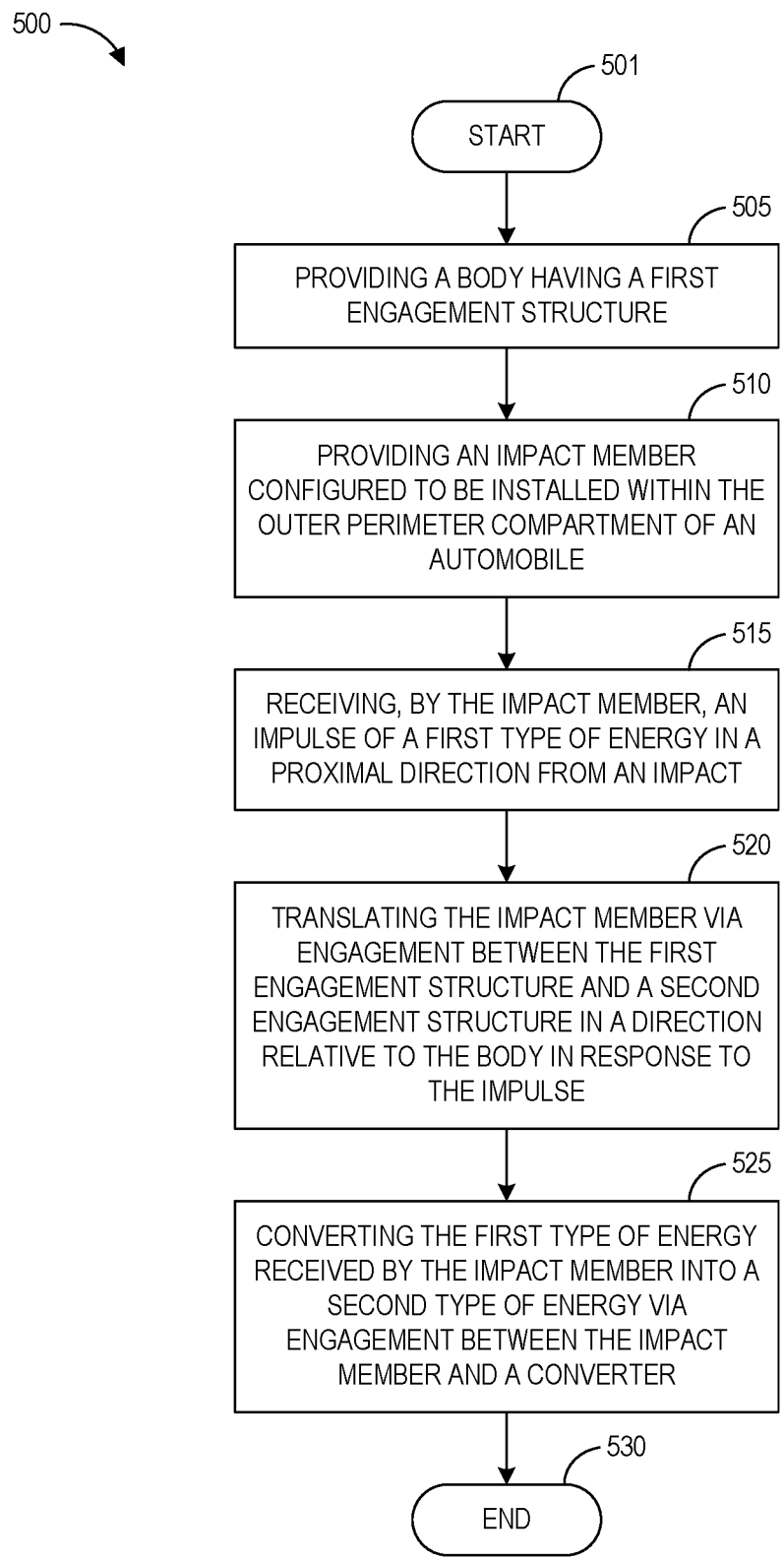
FIG. 8 is a flowchart illustrating an example method for converting energy from a first type of energy received by an impact to an automobile in a proximal direction into a second type of energy in accordance with aspects of this disclosure.

FIG. 8 is a flowchart illustrating an example method 500 for converting energy from a first type of energy received by the impact 400 to the automobile 100 in a proximal direction into a second type of energy in accordance with aspects of this disclosure. The automobile 100 comprises the outer perimeter compartment 300 and the inner compartment 350. The steps of the method 500 may be performed by one or more components of the automobile 100 illustrated in any one or more of FIGS. 1-7.

The method 500 begins at block 501. At block 505, the method 500 involves providing a body 205 having a first engagement structure 220. At block 510, the method 500 involves providing an impact member 210 configured to be installed within the outer perimeter compartment 300 of the automobile 100. The impact member 210 has a second engagement structure 225 and a third engagement structure 230. At block 515, the method 500 involves receiving, by the impact member 210, an impulse 405 of the first type of energy in the proximal direction from the impact 400. At block 520, the method 500 involves translating the impact member 210 via engagement between the first engagement structure 220 and the second engagement structure 225 in a direction relative to the body 205 in response to the impulse 405. At block 525, the method 500 involves converting the first type of energy received by the impact member 210 into the second type of energy via engagement between the impact member 210 and a converter 215. The method 500 ends at block 530.

While the above detailed description has shown, described, and pointed out novel features of the development as applied to various embodiments, it will be understood that various omissions, substitutions, and changes in the form and details of the devices illustrated may be made by those skilled in the art without departing from the spirit of the development. As will be recognized, the present development may be embodied within a form that does not provide all of the features and benefits set forth herein, as some features may be used or practiced separately from others. All changes which come within the meaning and range of equivalency of the claims are to be embraced within their scope.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The term "comprising" as used herein is synonymous with "including," "containing," or "characterized by," and is inclusive or open-ended and does not exclude additional, unrecited elements or method steps.

The above description discloses several methods of manufacture and materials of the present development. This development is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this development be limited to the specific embodiments disclosed herein, but that it cover all modifications and alternatives coming within the true scope and spirit of the development as embodied in the attached claims.

While the above detailed description has shown, described, and pointed out novel features of the improvements as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. An energy conversion system for converting a first type of energy received by an impact to an automobile in a proximal direction into a second type of energy, the automobile comprising an outer perimeter compartment and an inner compartment, the energy conversion system comprising:
   a body having a first engagement structure;
   an impact member configured to be installed within the outer perimeter compartment of the automobile to receive an impulse of the first type of energy in the proximal direction from the impact during a collision and translate in a direction relative to the body in response to the impulse, the impact member having a first end, a second end, a second engagement structure, and a third engagement structure, the second engagement structure and the third engagement structure being disposed between the first end and the second end, the second engagement structure being configured to engage with the first engagement structure of the body to facilitate the impact member translating in the direction relative to the body; and
   one or more electric motors disposed relative to the body and having a fourth engagement structure, the fourth engagement structure being configured to engage with the third engagement structure of the impact member and convert the first type of energy received by the impact member into the second type of energy thereby reducing deformation of the outer perimeter compartment,
   wherein the first type of energy is kinetic and the second type of energy is electrical.

2. The energy conversion system of claim 1, wherein the outer perimeter compartment comprises a bumper.

3. The energy conversion system of claim 1, wherein the outer perimeter compartment comprises a door.

4. The energy conversion system of claim 1, wherein the inner compartment is configured for passengers.

5. The energy conversion system of claim 1, wherein the direction is parallel to the proximal direction.

6. The energy conversion system of claim 1, wherein the proximal direction is in a direction generally towards a center of the automobile.

7. The energy conversion system of claim 1, wherein the first engagement structure is a channel within the body, the channel being configured to slidingly receive at least a portion of the impact member.

8. The energy conversion system of claim 1, wherein the second engagement structure is a predetermined size and shape of at least a portion of the impact member, the portion of the impact member being configured to be slidingly received by at least a portion of the first engagement structure.

9. The energy conversion system of claim 1, wherein the body is fixed relative to the automobile.

10. The energy conversion system of claim 1, wherein the impact member comprises a contact portion and a track portion, both the contact portion and the track portion translating together relative to the body.

11. The energy conversion system of claim 10, wherein the contact portion is configured as a cylindrical shaft.

12. The energy conversion system of claim 10, wherein the track portion is configured as a rectangular shaft.

13. The energy conversion system of claim 10, wherein the second engagement structure and the third engagement structure are disposed on the track portion of the impact member.

14. The energy conversion system of claim 10, wherein the third engagement structure is one or more teeth disposed on the track portion.

15. The energy conversion system of claim 14, wherein the one or more teeth are disposed on an edge of the track portion.

16. The energy conversion system of claim 1, wherein the fourth engagement structure is a plurality of teeth disposed on the one or more electric motors so as to engage with the third engagement structure of the impact member.

17. The energy conversion system of claim 14, wherein the fourth engagement structure is a plurality of teeth disposed so as to engage with the one or more teeth of the track portion.

18. The energy conversion system of claim 17, further comprising: one or more gears coupled to the one or more electric motors, the plurality of teeth being disposed on the one or more gears.

19. The energy conversion system of claim 18, wherein a first portion of the plurality of teeth are configured to engage with the one or more teeth of the track portion, and wherein a second portion of the plurality of teeth are configured to engage with the one or more electric motors.

20. The energy conversion system of claim 1, wherein the body and the impact member are arranged coaxially.

21. The energy conversion system of claim 1, wherein the energy conversion system is configured to change or redirect a direction of a force vector associated with the impulse received in the proximal direction.

22. An energy conversion system for converting a first type of energy received by an impact to an automobile in a proximal direction into a second type of energy, the automobile comprising an outer perimeter compartment and an inner compartment, the energy conversion system comprising:
   a body having a first engagement structure;
   an impact member configured to be installed within the outer perimeter compartment of the automobile to receive an impulse of the first type of energy in the proximal direction from the impact during a collision, the impact member having a second engagement structure and a third engagement structure, the second engagement structure being configured to engage with the first engagement structure of the body; and
   one or more electric motors having a fourth engagement structure configured to engage with the third engagement structure of the impact member and convert the first type of energy received by the impact member into the second type of energy thereby reducing deformation of the outer perimeter compartment,
   wherein the first type of energy is kinetic and the second type of energy is electrical.

23. A method for converting energy from a first type of energy received by an impact to an automobile in a proximal direction into a second type of energy, the automobile comprising an outer perimeter compartment and an inner compartment, the method comprising:
   providing a body having a first engagement structure;
   providing an impact member configured to be installed within the outer perimeter compartment of the automobile, the impact member having a second engagement structure and a third engagement structure;
   receiving, by the impact member, an impulse of the first type of energy in the proximal direction from the impact during a collision;
   translating the impact member via engagement between the first engagement structure and the second engagement structure in a direction relative to the body in response to the impulse; and converting the first type of energy received by the impact member into the second type of energy via engagement between the impact member and one or more electric motors thereby reducing deformation of the outer perimeter compartment, wherein the first type of energy is kinetic and the second type of energy is electrical.

* * * * *